Feb. 8, 1966 J. G. MITCHELL 3,233,879
FIXED CENTRIFUGAL GAS AND LIQUID CONTACTING DEVICE
Filed March 21, 1962
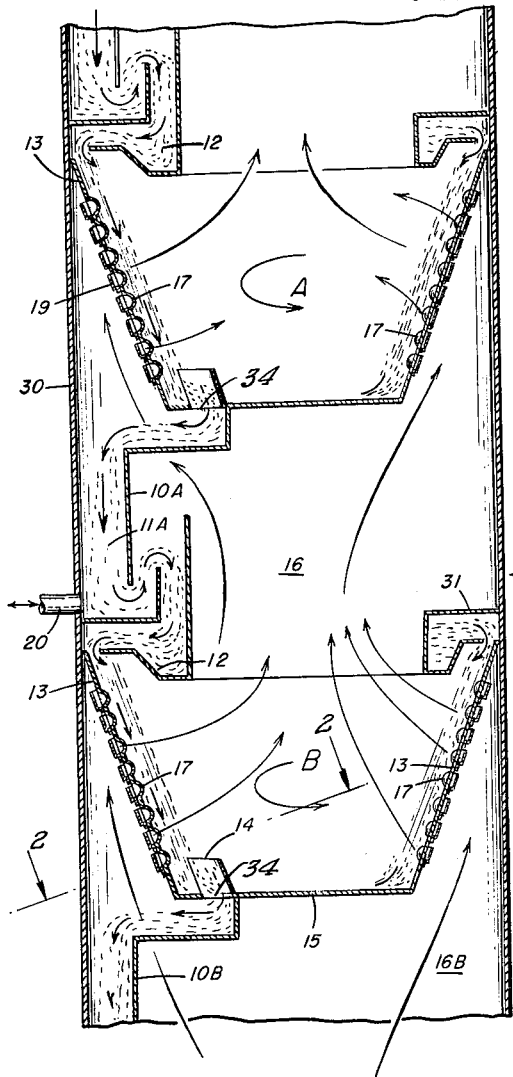
FIG.1
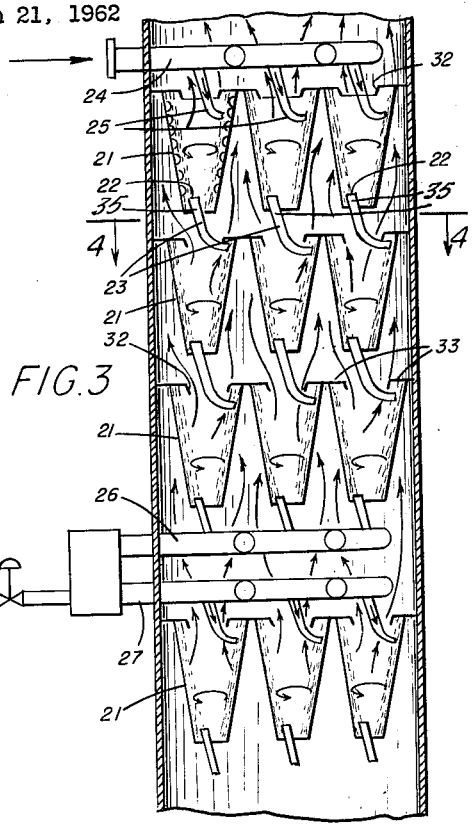
FIG.3
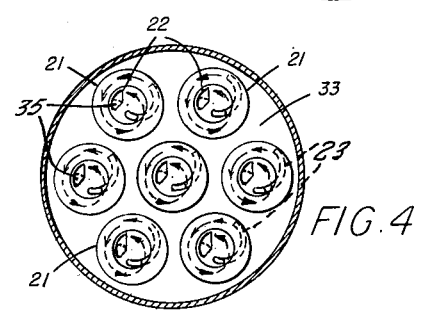
FIG.4
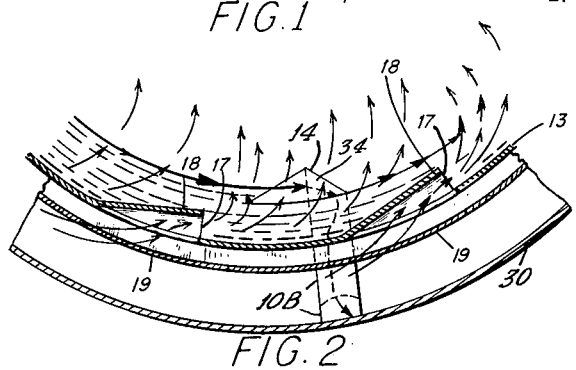
FIG.2
FIG.5
INVENTOR.
John G. Mitchell
BY Oswald G. Hoyer
Attorney

United States Patent Office 3,233,879
Patented Feb. 8, 1966

3,233,879
FIXED CENTRIFUGAL GAS AND LIQUID CONTACTING DEVICE
John G. Mitchell, Larchmont, N.Y., assignor to Socony Mobil Oil Company, Inc., a corporation of New York
Filed Mar. 21, 1962, Ser. No. 181,365
6 Claims. (Cl. 261—79)

This invention relates to improved means for effecting the intimate contact between two fluid phases. It is further related to an improvement in the plate design for such mass transfer operations as rectification, absorption and gas drying wherein centrifugal force is used to accomplish the intimate contact and separation between the two fluid phases.

At present, these operations may be conducted in either packed towers or plate towers of various types including bubble-cap, sieve and various forms of fixed or moving centrifugal plates. The multiple plate towers have found the greatest acceptance commercially, and of these the bubble-cap plate tower is the most popular.

The bubble-cap plates cannot handle high vapor velocities. This is especially so where the vapor density is high relative to the liquid density in high-pressure tower service. The high degree of entrainment under these conditions causes a decrease in the efficiency of the tower and a corresponding degeneration in product quality.

The previous fixed centrifugal-type plate towers also suffer somewhat from this entrainment problem. However, one of the primary problems facing the operators of these prior fixed centrifugal plate towers is the ineffectiveness of the towers at lower flow rates. Some of these previous devices required that the swirling vapor pick up the liquid which lies in a pool at the base of the plate. This requires a very high centrifugal vapor velocity above the surface of the liquid. As a result, these towers lack the flexibility necessary for the vagaries of commercial operation. As a second problem, there is often little or no contact between the vapor and a portion of the liquid which in certain of the designs is forced to flow down along the solid sides of the tower.

The object of this invention is to provide means for causing intimate contact between two fluid phases. This invention is particularly aimed at mass transfer operations where a wide range of operable flow rates is desired with a high efficiency for any load.

Basically, the invention comprises a frusto-conical or cylindrical plate to be used in a column for the contacting of two fluid phases so arranged and adapted that a liquid phase flows downwardly along the side wall with a horizontal velocity component, which causes the liquid to swirl or follow a helical path down the side of the plate, while a gaseous or second lighter, immiscible liquid phase is caused to pass through the liquid phase in a tangential direction through ports along the side of the plate. The vapor passing through the liquid imparts to the liquid some of its horizontal velocity component which causes the swirling movement. The plate may be installed in a tower, either individually, or in parallel and/or in series with other plates, so that the lighter fluid phase enters from an annular space, between the plate walls and the tower.

FIGURE 1 is a cut-away diagram of a portion of a contact column showing two plates in series.

FIG. 2 is a sectional view along 2—2.

FIG. 3 is a cut-away sectional diagram of a second embodiment of a column employing a cluster arrangement of smaller plates in a tower.

FIG. 4 is a sectional view along 4—4 of the horizontal cross section of the column shown in a vertical sectional view in FIGURE 3.

FIG. 5 is a partial cut-away view of another embodiment for the plate liquid drawoff of the centrifugal device.

Referring to FIG. 1, the liquid flows downwardly from the next higher plate A through a downcomer 10A, which has a liquid seal 11A, into the circumferential distribution gutter 12 of plate B. Outlet 20 is provided along the downcomer 10A to allow a side cut to be taken off or to allow a feedstream at that point. The liquid overflows from the lip of said gutter 12 and flows downwardly along the plate shell wall 13. A scoop drawoff 14, adjustably attached to the flat base 15, guides the liquid through an opening 34 in flat base 15 and into a downcomer 10B. By adjusting the position of the scoop 14, placing the inlet opening closer to or farther away from wall 13, the depth of the liquid flowing circumferentially around and down the wall may be controlled by "slicing off" excess liquid. At the top of wall 13 a top plate lip 31 is provided to prevent the liquid under centrifugal force from flowing up and out of the plate.

Vapor flows upwardly from the next lower plate. After passing through space 16B, the vapor enters the plate through the tangential orifices 17, located along the wall, and passes in a circumferential manner through the liquid, where intimate contact takes place. The upper end of the plate wall 13 may be attached directly or indirectly to the column wall 30 so as to form a vapor-tight seal to prevent any vapor from by-passing the plate.

Referring now to FIG. 2, the orifices 17 may be formed by punch forming tangential nozzles 18 in the shell wall 13 of the plate. A backup liquid seal may be provided by attaching strip gutters 19 to the outside of the shell wall where the nozzles 18 are located. For proper operation the nozzles should all be opening in the same tangential direction.

In the operation of this device, the downcoming liquid overflowing from gutters 12 flows into a circulating dispersed liquid-vapor blanket on the inside wall surface of the plate. This circulating blanket, and the vapor entering through the tangential orifices 17, impart a horizontal velocity component to the descending liquid on the wall.

The vapor passing through the liquid from the orifices 17 loses most of its tangential velocity and imparts energy to the swirling liquid. The liquid is continually forced back against the plate and this centrifugal action provides for liquid free vapor disengagement at high vapor rates. The swirling liquid is maintained at a given thickness on the plate and withdrawn from the plate through scoop drawoff 14.

A clustered arrangement of smaller plates 21 is shown in FIGS. 3 and 4. As illustrated in FIGS. 3 and 4, each layer of plates consists of seven small plates in parallel, each very similar to the larger plates described above. These plates are set into a tray support sheet 33 which is so constructed as to prevent vapor from by-passing the plates. The primary difference between these smaller plates and the larger individual plates lies in the scoop drawoff 22 and downcomer 23 and plate inlet arrangement. The liquid feed enters through line 24 which has individual spiraled outlets 25 to each small plate on the top layer. The scoop drawoff 22 in each plate, which should face in the opposite direction to the outlet opening of downcomer 25 or into the direction of the swirling liquid on the plate, in this embodiment guides the liquid, in a manner similar to that of scoop 14 in FIGURES 1 and 2, through an opening 35 in the flat base of the plate, which opening 35 is the inlet to a spiral downcomer 23 which conserves the horizontal velocity (or swirling motion) of the liquid from the upper tray and distributes the liquid at high tangential velocity to the top of the lower tray. The preservation of the tangential velocity of the liquid from tray to tray increases the vapor load capacity of the top of each tray and reduces tray to tray vapor pressure loss because the vapor does not have to re-accelerate the liquid on each tray. The downcomer may be tapered so as to be smaller at the bottom. The downcomer exhausts the liquid directly onto the wall of the next lower plate tangentially to said wall. The velocity head of the liquid through the downcomer helps maintain the vapor seal from tray to tray. The bottom layer of plates exhaust into line 26, which may be used to take a side cut, if desired, and return the remainder to the column through line 27. Each plate is provided with a liquid retaining lip 32 to prevent the liquid under centrifugal force from flowing up and out of the plate.

Referring to FIG. 5, the plate may be alternately constructed so that the drawoff scoop 22 guides the liquid swirling downward from passage across tangential ports 36 through the opening 35 in the flat base of the plate and into a small conventional type downcomer seal 28 integral with the base of the plate. Spiral downcomer 29 leads from the downcomer seal 28 to the next lower plate.

The "clustered group" arrangement shown in FIGS. 3 and 4 is preferred for general use. The advantage of this arrangement over the first described is that a greater contact surface area and disengagement area can be provided in a tower of a given diameter and height. The use of the spiral downcomer to conserve the liquid tangential velocity from tray to tray results in a more efficient tray operation, less vapor pressure drop and higher vapor disengaging capacity.

The following example will show the relative capacity of the clustered unit described above compared with a conventional bubble-plate design.

*Example*

A liquid having a density of 50#/ft.³ is contacted counter-currently with a vapor having a density of 2.3#/ft.³. The liquid blanket in each plate of the clustered type unit has a depth of one inch and a velocity of 12.0 ft./sec. The vapor velocity through the orifices is 33 ft./sec. In a given tower employing clustered plates having a diameter of 1 ft. and a height of 1.5 ft. the percent increase in tray area of the new design over the conventional bubble plate is about 100–200% and the percent increase in allowable vapor capacity is about 600–700%.

The above-described drawings show conical shaped plates, whose sides lie at approximately a 5°–20° angle with the vertical. However, the invention should not be restricted only to this embodiment. A cylindrical plate with vertical sides will often be at least as effective as these conical plates. Indeed, for the smaller diameter plates, where the centrifugal force on the liquid for a given angular velocity will be greatest, an essentially vertical plate may be preferred. However, for larger plates the frusto-conical design would provide for greater mechanical strength and provide for a uniform liquid depth on the plate for a given liquid velocity. The slope for the plate wall is a function of centrifugal and gravitational acceleration on the liquid..

This device is highly effective over an extremely wide range of both vapor and liquid flow rates. Unlike some of the prior fixed centrifugal devices where the energy of the swirling mass vapor is used to pick up liquid from the bottom of the tray, or to help the liquid move upward through the plate from the entry nozzle at the bottom of the plate, the vapor velocity need not be as high. The instant method also does not have as big an entrainment problem as these older devices where uneven tangential velocities of the liquid and the rapidly swirling vapor almost of necessity must carry liquid droplets over.

Likewise, this device is suitable under higher liquid rates. In other devices where the liquid must be forced up from the bottom of each tray the pressure drop becomes extreme. On the other hand, those older devices utilizing downwardly flowing liquid had defects whereby the contact between the liquid and vapor was not complete especially at these higher liquid flows. This was caused by the tendency, in these units, for the liquid to be forced to run down along the solid walls of the tower.

These difficulties are alleviated in this present design. The vapor after it passes through the tangential orifice flows into intimate contact with a uniformly deep and swirling liquid mass. The evenly distributed centripetal force on the liquid over the entire surface of the plate also provides for high liquid-vapor separation and uniform contact. Similarly, the downwardly flowing liquid rather than being forced against solid walls is forced against the interior of the perforated plate walls, by the centrifugal force, where the vapor passing through the perforations moves into contact with it.

This device is adaptable for use in mass transfer operations involving the contacting of a gas and a liquid phase as well as those operations involving liquid-liquid contact. It is perhaps better suited, however, for such gas-liquid operations as rectification or general fractional distillation. Operations involving the absorption or scrubbing of a gas by a liquid or the stripping out of a gas dissolved in a liquid would also be improved by the use of this invention instead of previous devices.

The specific embodiments described above are merely exemplary of the general idea of the invention and they should not be construed as restricting the scope and breadth of the invention as it is set out in the claims below.

What is claimed is:

1. A contacting device, adapted to be disposed within a contacting column for contacting an upwardly flowing first fluid medium with a downwardly flowing relatively heavier second fluid, comprising a plate member, a substantially vertically disposed member in fluid-tight engagement with the periphery of said plate member to form with said plate member a shell closed at its bottom end by said plate member, said substantially vertically disposed member having a plurality of ports oriented at an angle oblique to said vertical member, means for directing flow of said downwardly flowing fluid medium onto the inner wall surface of said vertical member and means for directing passage of said upwardly flowing fluid through said ports into contact with said fluid on the inner wall of said vertical member, an opening through said horizontally disposed plate member spaced apart from the periphery of said plate member and adapted to discharge fluid flowing down the wall surface of said vertical member, means disposed on the upper surface of said plate member for diverting into said opening fluid flowing down the wall surface of said vertical member, and means adapted to maintain said discharged fluid free from contact with fluid medium flowing upwardly to said ports.

2. A contacting device, as defined in claim 1, in which said substantially vertically disposed member forms with said plate member a shell having a frusto-conical shape.

3. An apparatus, adapted for contacting an upwardly flowing first fluid medium with a downwardly flowing relatively heavier second fluid medium, comprising a contacting column in which is disposed at least one contacting device comprising a plate member horizontally disposed within said column, said plate member having a diameter smaller than the inside diameter of said column thereby providing an annulus between the periphery of said plate member and the inner wall surface of said column, a substantially vertically disposed member in fluid-tight engagement with the peripheral of said plate member to form with said plate a shell closed at its bottom end by said plate member, said substantially vertically disposed member having a plurality of ports oriented at an angle oblique to said vertical member for passage of said upwardly flowing fluid medium from said annulus through said ports, means for preventing passage of the upwardly flowing fluid medium out of said annulus other than through said ports, means disposed in said column to confine said downwardly flowing fluid medium onto the inner wall surface of said vertical member to be contacted thereon by a fluid medium passing from said annulus through said ports, an opening through said horizontally disposed plate member spaced away from the periphery of said plate member and adapted to discharge fluid flowing down the wall surface of said vertical member, means disposed on the upper surface of said plate for directing into said opening fluid flowing down the wall surface of said vertical member, and means adapted to maintain said discharged fluid free from contact with fluid medium flowing upwardly into said annulus.

4. An apparatus, as defined in claim 3, in which said substantially vertically disposed member forms with said plate member a shell having a frusto-conical shape.

5. An apparatus, as defined in claim 3, in which a plurality of said contacting devices are disposed in a vertical series.

6. An apparatus, as defined in claim 5, in which said means adapted to maintain said discharged fluid free from contact with the fluid medium flowing upwardly into said annulus comprises a spiral conduit means adapted to confine said discharged fluid onto the inner wall surface of said vertical member of one of said plurality of contacting devices lower in said vertical series.

References Cited by the Examiner
UNITED STATES PATENTS

| | | |
|---|---|---|
| 968,456 | 8/1910 | Edwards. |
| 1,072,849 | 9/1913 | Hart. |
| 1,670,743 | 5/1928 | Schneible. |
| 1,878,467 | 9/1932 | Clarke. |
| 1,980,522 | 11/1934 | Hawley ---------- 55—237 XR |
| 2,075,344 | 3/1937 | Hawley. |
| 2,147,786 | 2/1939 | Fenske et al. ---- 261—114 XR |
| 2,578,315 | 12/1951 | Parker ---------- 55—237 XR |
| 2,698,282 | 12/1954 | Findlay. |
| 3,028,151 | 4/1962 | Kittel. |

FOREIGN PATENTS

| | | |
|---|---|---|
| 601,968 | 1/1960 | Canada. |
| 485,807 | 5/1938 | Great Britain. |
| 719,197 | 11/1954 | Great Britain. |

HARRY B. THORNTON, *Primary Examiner.*

HERBERT L. MARTIN, *Examiner.*